United States Patent [19]

Ishihara et al.

[11] Patent Number: 5,082,960

[45] Date of Patent: Jan. 21, 1992

[54] CONJUGATED DIACETYLENE BOND-CONTAINING SILICON COMPOUND AND METHOD FOR PRODUCING SAME

[75] Inventors: Toshinobu Ishihara; Tohru Kubota; Mikio Endo, all of Joetsu, Japan; Katsuyuki Oikawa, Phoenix, Ariz.

[73] Assignee: Shin-Etsu Chemical Co., Ltd., Japan

[21] Appl. No.: 649,870

[22] Filed: Feb. 5, 1991

[30] Foreign Application Priority Data

Feb. 5, 1990 [JP] Japan .................................. 2-25852

[51] Int. Cl.$^5$ .............................................. C07F 7/08
[52] U.S. Cl. ...................................... 556/444; 556/445
[58] Field of Search ............................... 556/444, 445

[56] References Cited

U.S. PATENT DOCUMENTS 4,827,007  5/1989  Choi .................................... 556/444

OTHER PUBLICATIONS

Chemical Abstracts, vol. 93, No. 11, Abstract No. 113,700, Sep. 15, 1980, p. 1, 656.
Chemical Abstracts, vol. 110, No. 18, Abstract No. 163, 108, May 1, 1989, p. 1, 603.
Chemical Abstracts, vol. 111, No. 24, Abstract No. 221,525, Dec. 11, 1989, p. 1, 483.

Primary Examiner—Paul F. Shaver

[57] ABSTRACT

A novel conjugated diacetylene bond-containing silicon compound represented by the following formula (I):

$$A(CH_2)_mC≡CC≡C(CH_2)_nO(CH_2)_3SiX^1X^2X^3 \qquad (I)$$

wherein A is a hydrogen atom, a vinyl group or a dimethylsilyl group; $X^1$, $X^2$ and $X^3$ may are a halogen atom or an alkoxy group having 1 to 4 carbon atoms; and m and n each represents an integer ranging from 1 to 15. The novel compound can be produced by the step of reacting an allyl ether compound being the following formula (II)

$$A(CH_2)_mC≡CC≡C(CH_2)_nOCH_2CH=CH_2 \qquad (II)$$

with a hydrogenated silicon compound being the following formula (III):

$$HSiX^1X^2X^3 \qquad (III)$$

in the presence of a transition metal catalyst. The novel compound can provide, on the surface of an inorganic substrate a monomolecular film which is strongly adhered or bonded to the surface of the substrate. The coating layer therefrom does not cause any releasing phenomenon such as evaporation and/or scattering and thus, the compound can be used in a variety of fields such as optical materials, resist materials and conductive materials.

13 Claims, No Drawings

CONJUGATED DIACETYLENE BOND-CONTAINING SILICON COMPOUND AND METHOD FOR PRODUCING SAME

BACKGROUND OF THE INVENTION

The present invention relates to a novel silicon compound useful as, for instance, non-linear optical materials, resist materials as well as conductive materials and a method for producing the silicon compound.

It is easy to form a monomolecular film having good quality from a long chain conjugated diacetylene compound according to the Langmuir-Blodget method (hereunder referred to as "LB-method"). Moreover, the long chain conjugated diacetylene compound can provide a polymer carrying conjugated double bonds and triple bonds by irradiating it with radiant-rays such as ultraviolet rays, X-rays or γ-rays and, therefore, has become of major interest lately as a variety of functional materials.

In the field of non-linear optics, for instance, G. M. Carter, Y. J. Chan take notice of high speed response of a conjugated π-electron system-containing polymer and have developed a technique in which a film of a monomer formed according to the LB-method is polymerized by irradiation with γ-rays or the like to thus form polydiacetylene bonds and the resulting polymer is used as a three-dimensional non-linear optical material (see ACS Symposium Series, 1983, 233, p. 213). Alternatively, in the field of semiconductors, the LB-method has attracted much attention as a novel film-forming technique for forming a resist used in the photolithography processes and a conjugated diacetylene compounds have been investigated as one of materials for resists to be formed according to the LB-method (A. Barraud, Thin Solid Films, 1983, 99, p. 317).

As such long chain conjugated diacetylene compounds, diacetylene type aliphatic acids have been exclusively used because of their ease of handling in the LB-method. However, the monomolecular film obtained from such a compound is essentially simply adsorbed on a substrate and, therefore, the compound and hence the monomolecular film is easily released from the surface of the substrate through evaporation and/or scattering.

SUMMARY OF THE INVENTION

Accordingly, an object of the present invention is to provide a novel compound, i.e., a conjugated diacetylene bond-containing silicon compound which makes it possible to form a monomolecular film strongly bonded to the surface of an inorganic substrate.

Another object of the present invention is to provide a method for producing a novel conjugated diacetylene bond-containing silicon compound.

According to an aspect of the present invention, there is provided a conjugated diacetylene bond-containing silicon compound represented by the following formula (I):

$$A(CH_2)_mC\equiv CC\equiv C(CH_2)_nO(CH_2)_3SiX^1X^2X^3 \qquad (I)$$

wherein A represents a hydrogen atom, a vinyl group or a dimethylsilyl group $X^1$, $X^2$ and $X^3$ may be the same or different and each represents a halogen atom or an alkoxy group having 1 to 4 carbon atoms; and m and n each represents an integer ranging from 1 to 15.

According to another aspect of the present invention, there is provided a method for producing a conjugated diacetylene bond-containing silicon compound represented by the following formula (I):

$$A(CH_2)_mC\equiv CC\equiv C(CH_2)_nO(CH_2)_3SiX^1X^2X^3 \qquad (I)$$

wherein A represents a hydrogen atom, a vinyl group or a dimethylsilyl group $X^1$, $X^2$ and $X^3$ may be the same or different and each represents a halogen atom or an alkoxy group having 1 to 4 carbon atoms; and m and n each represents an integer ranging from 1 to 15, which comprises the step of reacting an allyl ether compound represented by the following formula (II)

$$A(CH_2)_mC\equiv CC\equiv C(CH_2)_nOCH_2CH=CH_2 \qquad (II)$$

wherein A, m and n are the same as those defined above, with a hydrogenated silicon compound represented by the following formula (III):

$$HSiX^1X^2X^3 \qquad (III)$$

wherein $X^1$, $X^2$ and $X^3$ are the same as defined above, in the presence of a transition metal catalyst.

The conjugated diacetylene bond-containing silicon compound according to the present invention can provide, on the surface of an inorganic substrate, a monomolecular film which is strongly adhered or bonded to the surface of the substrate. In addition, the coating layer obtained from this compound does not cause any releasing phenomenon such as evaporation and/or scattering and thus, the compound of the present invention can be used in a variety of fields such as optical materials, resist materials and conductive materials.

DESCRIPTION OF THE PREFERRED EMBODIMENTS

The present invention will hereinafter be explained in more detail.

In the conjugated diacetylene bond-containing silicon compound represented by the formula (I) of the present invention; A represents a hydrogen atom; a vinyl group or a dimethylsilyl group; $X^1$, $X^2$ and $X^3$ may be the same or different and each represents a halogen atom, preferably chlorine atom or a bromine atom or an alkoxy group having 1 to 4 carbon atoms, preferably a methoxy group or an ethoxy group; and m and n each represents an integer ranging from 1 to 15.

Preferred examples of the conjugated diacetylene bond-containing silicon compound represented by the formula (I) of the present invention are those listed below:

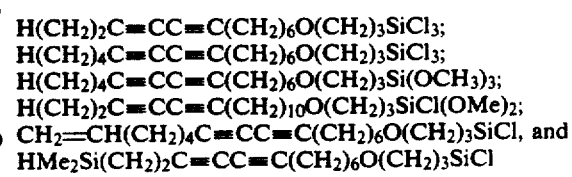

$H(CH_2)_2C\equiv CC\equiv C(CH_2)_6O(CH_2)_3SiCl_3$;
$H(CH_2)_4C\equiv CC\equiv C(CH_2)_6O(CH_2)_3SiCl_3$;
$H(CH_2)_4C\equiv CC\equiv C(CH_2)_6O(CH_2)_3Si(OCH_3)_3$;
$H(CH_2)_2C\equiv CC\equiv C(CH_2)_{10}O(CH_2)_3SiCl(OMe)_2$;
$CH_2=CH(CH_2)_4C\equiv CC\equiv C(CH_2)_6O(CH_2)_3SiCl$, and
$HMe_2Si(CH_2)_2C\equiv CC\equiv C(CH_2)_6O(CH_2)_3SiCl$ These conjugated diacetylene bond-containing silicon compounds can be produced by the method of the present invention which comprises reacting the allyl ether compound (II) with the hydrogenated silicon compound (III) in the presence of a transition metal catalyst.

Specific examples of the allyl ether compounds represented the formula (II) used for producing the silicon compound of the present invention as a starting material include those listed below:

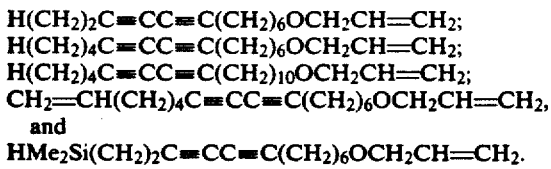

On the other hand, specific examples of the hydrogenated silicon compound represented by the formula (III) used for producing the silicon compound of the present invention as another starting material are as follows: $HSiCl_3$; $HSiBr_3$; $HSi(OCH_3)_3$; $HSi(OCH_2CH_3)_3$, and $HSiCl(OMe)_2$.

The transition metal catalysts used in the production of the silicon compound of the present invention include, for instance, $H_2PtCl_6$, $PtCl_2(PPh_3)_2$. $PdCl_2(PPh_3)_2$ and $RhCl(PPh_3)_3$, wherein Ph represents a phenyl group. The amount of the transition metal catalyst desirably ranges from 10 to 500 ppm on the basis of the amount of the allyl ether compound used.

It is preferred to use, in the foregoing reaction, a reactor equipped with a stirring machine, a thermometer, a reflux condenser and a dropping funnel. In addition, this reaction is desirably carried out at a temperature ranging from 20° to 100° C. while the hydrogenated silicon compound is dropwise added to the reaction system. In this reaction, it is also possible to use, if necessary, an aprotic solvent such as toluene, xylene or tetrahydrofuran (THF) as a reaction solvent.

When the conjugated diacetylene bond-containing silicon compound is used as a coating agent, it is preferably used according to the following manner. First, the compound is dissolved in a proper organic solvent such as n-hexane, chloroform or carbon tetrachloride. Thereafter, an inorganic substrate to be coated is dipped in the resulting solution of the compound and then pulled out of the solution. Thus, the substrate is coated with the compound. Alternatively, the solution may be sprayed on the substrate or may be applied by a roll coating method. After the completion of the coating, the coating layer is allowed to stand at ordinary temperature or heated to dry the layer. Thus, the coating of the substrate is finished.

The Si-X group of the compound causes reaction with hydroxyl groups present on the surface of the substrate or causes hydrolysis on the surface thereof to form covalent bonds such as siloxane bonds through the foregoing coating treatment and thus a monomolecular film is formed on the surface of the inorganic substrate and strongly bonded to the surface.

The monomolecular film formed from the compound of the present invention is strongly bonded to the surface of an inorganic substrate and is a uniform film since molecules constituting the film are not released by evaporation and/or scattering.

The conjugated diacetylene bonds cause polymerization when the monomolecular film is irradiated with radiant-rays such as ultraviolet rays, X-rays or γ-rays and as a result, a polymer comprising double bonds and triple bonds is formed. Therefore, the compounds are acceptable as non-linear optical materials, resist materials, conductive materials or the like.

Moreover, when the compounds of the present invention which have a vinyl group or a dimethylsilyl group at the end thereof are employed, a monomolecular film can be formed and then treated with diborane-hydrogen peroxide for the compound carrying a vinyl group or with an alkali for the compound carrying a dimethylsilyl group to generate hydroxyl groups. The hydroxyl groups makes it possible to increase the number of monomolecular layers.

In the present invention, the thickness of the monomolecular film formed from the compound of the invention:

$$A(CH_2)_mC\equiv CC\equiv C(CH_2)_nO(CH_2)_3SiX^1X^2X^3 \qquad (I)$$

can be arbitrarily controlled by adjusting the number of carbons, i.e., m and n. However, if the sum of m and n exceeds 20, the carbon chain becomes very long and intertwining between the molecular chains is liable to be caused and thus it becomes very difficult to form a well regulated monomolecular film. For this reason, the sum of m and n is preferably not more than 30 and more preferably not more than 20.

The present invention will hereunder be explained in more detail with reference to the following non-limitative working Examples.

EXAMPLE 1

Preparation of 4-Oxy-11,13-hexadecadiynyl trichlorosilane

To a reactor, i.e., 300 ml volume brown flask equipped with a stirring machine, a reflux condenser, a thermometer and a dropping funnel, there were added 30.6 g (0.14 mole) of 7,9-dodecadiynyl allyl ether, 50 ml of toluene and 0.1 g of a 4% isopropyl alcohol solution of $H_2PtCl_6\cdot6H_2O$. To the mixture, there was dropwise added 20.3 g (0.15 mole) of trichlorosilane through the dropping funnel over 2 hours at 25° to 30° C. and the resulting mixture was aged at 30° C. for 4 hours. The reaction solution was distilled to give 21.8 g of a compound having a boiling point of 180° to 190° C./3 mmHg. The yield of the compound was 44.0%.

Mass spectrometric (MS) measurement, nuclear magnetic resonance (NMR) spectroscopic measurement and infrared (IR) spectroscopic measurement were performed on the resulting compound and the results were summarized below.

Mass Spectra (MS): m/z (attribution), electron bombardment ionization 352, 354, 356 (molecular ion peaks), 175, 177, 179 (molecule—$O(CH_2)_6C\equiv C-C\equiv CCH_2CH_3$).

Nuclear Magnetic Resonance Spectra (NMR): δ(ppm)

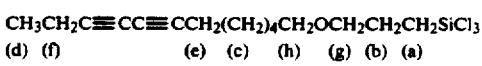

a: 0.75~1.05 (M)
bcd: 1.05~1.90 (M)
ef: 2.00~2.55 (M)
gh: 3.20~3.50 (M)

Infrared Absorption Spectra (IR): $cm^{-1}$ 2930, 2850, 2220, 1460, 1440, 1375, 1200, 1160, 1120, 1060, 760.

From these results obtained, it was confirmed that the resulting compound was $CH_3CH_2C\equiv CC\equiv C(CH_2)_6O(CH_2)_3SiCl_3$.

EXAMPLE 2

Preparation of 4-Oxy-11,13-Octadecadiynyl trichlorosilane

The same procedures used in Example 1 were repeated except that 34.5 g (0.14 mole) of 7,9-tetradecadiynyl allyl ether was substituted for 30.6 g (0.14 mole) of 7,9-dodecadiynyl allyl ether to give 20.2 g of a compound having a boiling point of 200°~215° C/3 mmHg. The yield thereof was 40.8%.

Mass spectrometric (MS) measurement, nuclear magnetic resonance (NMR) spectroscopic measurement and infrared (IR) spectroscopic measurement were performed on the resulting compound and the results were summarized below.

Mass Spectra (MS): m/z (attribution), electron bombardment ionization 380, 382, 384 (molecular ion peaks), 175, 177, 179 (molecule—$O(CH_2)_6C\equiv C-C\equiv C(CH_2)_3CH_3$).

Nuclear Magnetic Resonance Spectra (NMR): $\delta$(ppm)

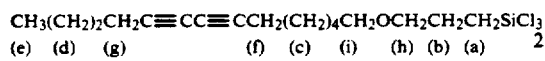

a: 0.75~1.05 (M)
bcde: 1.05~1.95 (M)
fg: 2.00~2.60 (M)
hi: 3.15~3.50 (M)

Infrared Absorption Spectra (IR): $cm^{-1}$ 2930, 2850, 2220, 1470, 1440, 1200, 1120, 1060, 760.

From these results obtained, it was confirmed that the resulting compound was $CH_3(CH_2)_3C\equiv CC\equiv C(CH_2)_6O(CH_2)_3SiCl_3$.

What is claimed is:

1. A conjugated diacetylene bond-containing silicon compound represented by the following formula (I):

      (I)

wherein A represents a hydrogen atom, a vinyl group or a dimethylsilyl group $X^1$, $X^2$ and $X^3$ may be the same or different and each represents a halogen atom or an alkoxy group having 1 to 4 carbon atoms; and m and n each represents an integer ranging from 1 to 15.

2. The conjugated diacetylene bond-containing silicon compound as set forth in claim 1 wherein the halogen atom is chlorine atom or bromine atom.

3. The conjugated diacetylene bond-containing silicon compound as set forth in claim 1 wherein the alkoxy group is a methoxy group or an ethoxy group.

4. The conjugated diacetylene bond-containing silicon compound as set forth in claim 1 wherein the halogen atom is chlorine atom or bromine atom an the alkoxy group is a methoxy group or an ethoxy group.

5. The conjugated diacetylene bond-containing silicon compound as set forth in claim 1 wherein it is a member selected from the group consisting of compounds represented by the following formulae:

6. The conjugated diacetylene bond-containing silicon compound as set forth in claim 1 wherein the sum of m and n in the formula (I) is not more than 20.

7. A method for producing a conjugated diacetylene bond-containing silicon compound represented by the following formula (I):

      (I)

wherein A represents a hydrogen atom, a vinyl group or a dimethylsilyl group $X^1$, $X^2$ and $X^3$ may be the same or different and each represents a halogen atom or an alkoxy group having 1 to 4 carbon atoms; and m and n each represents an integer ranging from 1 to 15, comprising the step of reacting an allyl ether compound represented by the following formula (II)

      (II)

wherein A, m and n are the same a those defined above, with a hydrogenated silicon compound represented by the following formula (III):

$$HSiX^1X^2X^3 \quad\quad (III)$$

wherein $X^1$, $X^2$ and $X^3$ are the same as defined above, in the presence of a transition metal catalyst.

8. The method as set forth in claim 7 wherein the compound represented by the formula (II) is a member selected from the group consisting of those listed below:

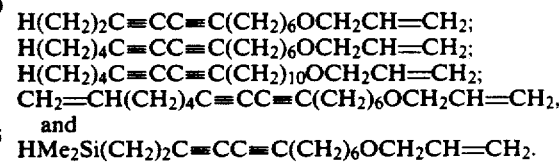

9. The method as set forth in claim 7 wherein the compound represented by the formula (III) is a member selected from the group consisting of HSiCl$_3$, HSiBr$_3$, HSi(OCH$_3$)$_3$, HSi(OCH$_2$CH$_3$)$_3$ and HSiCl(OMe)$_2$.

10. The method as set forth in claim 7 wherein the compound represented by the formula (II) is a member selected from the group consisting of those listed below:

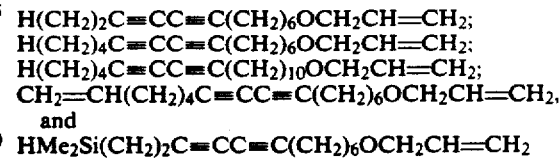

and the compound represented by the formula (III) is a member selected from the group consisting of HSiCl$_3$, HSiBr$_3$, HSi(OCH$_3$)$_3$, HSi(OCH$_2$CH$_3$)$_3$ and HSiCl(OMe)$_2$.

11. The method as set forth in claim 7 wherein the transition metal catalyst is a member selected from the group consisting of H$_2$PtCl$_6$, PtCl$_2$(PPh$_3$)$_2$, PdCl$_2$(PPh$_3$)$_2$ and RhCl(PPh$_3$)$_3$, wherein Ph represents a phenyl group.

12. The method as set forth in claim 11 wherein the transition metal catalyst is used in an amount ranging from 10 to 500 ppm on the basis of the amount of the allyl ether compound (II) used.

13. The method as set forth in claim 7 wherein the sum of m and n in the foregoing formulae is not more than 20.

* * * * *